Figure 1:
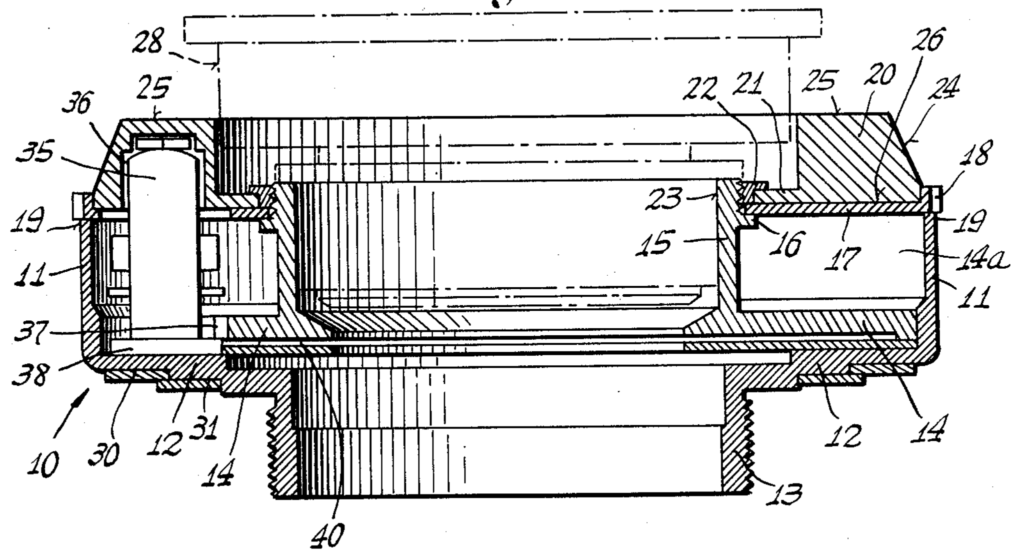

PHOTOGRAPHIC SHUTTER HOUSING CONSTRUCTION

Filed Nov. 29, 1955

INVENTOR.
Karl Friedrich Rentschler
BY
Munn, Liddy, Nathanson & March
ATTORNEYS

United States Patent Office 2,943,543

Patented July 5, 1960

2,943,543

PHOTOGRAPHIC SHUTTER HOUSING CONSTRUCTION

Karl F. Rentschler, Calmbach (Enz), Germany, assignor to Alfred Gauthier G.m.b.H., Calmbach (Enz), Germany, a corporation of Germany Filed Nov. 29, 1955, Ser. No. 549,784

Claims priority, application Germany Dec. 3, 1954

1 Claim. (Cl. 95—10)

This invention relates to photographic intra-lens shutter housing structures, and more particularly to such structures wherein there are incorporated electric exposure regulators.

Electric exposure regulators as currently produced for intra-lens and others camera shutter constructions generally comprise an electric measuring device disposed in a casing which is intended to be secured to and carried by the camera structure. Due to the design and construction of these measuring devices, the casings therefor require certain minimum dimensions not the least important of which is a predetermined minimum height.

In order to insure proper and reliable operation of the measuring device at all times it is important that the device be fully enclosed and safeguarded against external forces, such as accidental knocks, blows or the like. It is further desirable and advantageous to have the measuring device incorporated in the shutter construction without altering housing dimensions or the like which have, over a period of years, become virtually standardized. Also, it is undesirable to so incorporate the electrical measuring device that it would project from the shutter construction and be unsightly, or cause an obstruction.

In connection with avoiding alteration of the shutter housing dimensions, it is clear that by so doing the exposure regulator may be incorporated without considerable change in a large variety of camera models already existing or in production.

The above problems have been successfully met by the present invention, and an object of the invention is to provide a novel and improved photographic intra-lens shutter housing construction which is so constituted and organized that it may have incorporated in it an electrical measuring device of an exposure regulator in such a manner as to not require alteration of the basic or fundamental dimensions and proportions of the structure.

A further object of the invention is to provide an improved photographic intra-lens shutter housing construction as above set forth, wherein there may be incorporated an electrical measuring device of an exposure regulator without the necessity for having unsightly projecting portions or sections not heretofore existent in the usual camera construction.

Still another object of the invention is to provide an improved shutter housing construction as above characterized, wherein an electrical measuring device may be readily incorporated in the housing and fully protected from outside forces which might adversely affect its operation, as for example accidental knocks, blows or the like.

In accomplishing the above objects I provide, in accordance with the invention and as exemplified in one embodiment thereof, a shallow cup-shaped shutter housing and a relatively thick cover member therefor in the form of an annulus having tapered outside walls, the arrangement being such that a space exists between the cover member and the bottom of the cup shaped housing for the accommodation of the shutter actuating and timing mechanism. In the housing and adjacent the bottom wall thereof there is provided the usual base plate which carries the shutter actuating mechanism. I provide in said base plate a through aperture and in the cover member a rearwardly opening recess which is in registration with the said through aperture and extends closely adjacent the front wall of the cover member. I have found that there may be made available within said aperture and recess the space necessary for accommodation of available electrical measuring devices, and further that such a device may be conveniently mounted on the rear transverse wall of the shallow cup-like shutter housing. By this I accomplish a three-fold, advantageous result: First, I am able to incorporate the measuring device in housing structures without changing the basic or fundamental dimensions thereof; second, the measuring device may be incorporated without requiring the addition of projecting and unsightly portions or sections to the existing housing construction; and third, the electrical measuring device will be completely enclosed and protected against external forces such as accidental blows or the like.

While in the embodiment of the invention illustrated herein the measuring device casing extends through the base plate aperture and is secured to the rear transverse wall of the housing, the invention is not to be limited to such construction since it embraces broadly the concept of providing the recess in the cover member, into which the electric measuring device may project and thereby be wholly included in the shutter housing without requiring projections therefrom.

A feature of the invention resides in the provision of an improved photographic shutter housing construction in accordance with the above, which has all of the aforementioned advantages and is nevertheless simple in its construction and economical to manufacture.

Other features and advantages will hereinafter appear.

In the drawings accompanying this specification, similar characters of reference indicate corresponding parts wherever possible in the several views, in which:

Figure 1 is a longitudinal sectional view through a photographic intra-lens shutter structure having incorporated therein the electrical measuring device of an exposure regulator. The measuring device is shown as occupying a recess in the cover member. Certain parts unessential to the invention, as for example details of the shutter and actuating mechanism therefor, have been omitted.

Figure 2:
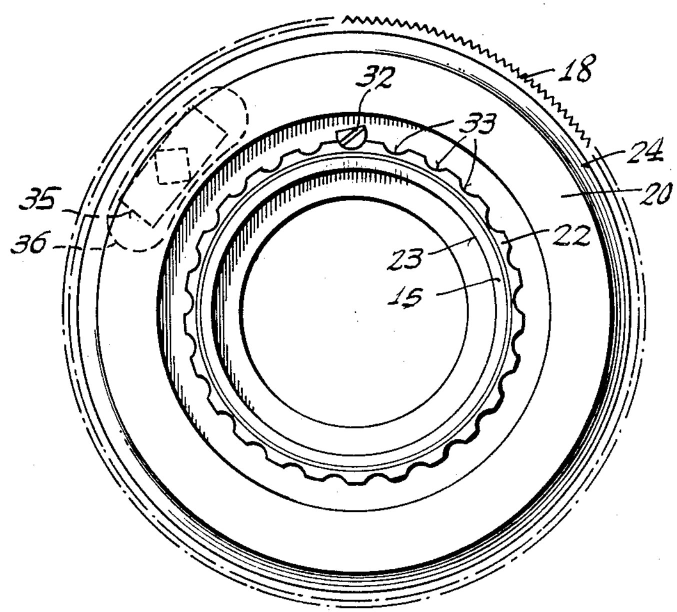

Fig. 2 is a front elevational view of the shutter construction of Fig. 1.

As shown, the improved shutter construction of the present invention comprises a shutter housing indicated generally by the numeral 10, having peripheral or outer side walls 11 which are preferably of cylindrical shape, and having a rear transverse end or bottom wall 12 joining the side walls 11 and secured also to a mounting means, the latter being in the form of a threaded neck 13. It will be noted that the shutter housing 10, by virtue of the side walls 11 and transverse rear wall 12, is in the form of a shallow cup, and as is customary there is disposed within the cup a base plate 14, located adjacent the rear wall 12 of the housing and adapted to carry in a space 14*a* a shutter-actuating mechanism, which is not shown herein since it forms no part of the present invention.

The base plate 14 has a cylindrical collar portion or nozzle 15 provided with a shoulder 16 on which there rests a flat, speed-setting ring or annulus 17 having a forward-projecting peripheral, knurled flange 18. The peripheral portion of the speed-setting ring 17 also rests on the front lip 19 formed by the peripheral walls 11 of the housing 10.

A relatively-thick, annular or ring-shaped cover member 20 is provided, located in front of the speed-setting ring 17 and in engagement therewith, the member 20 having on its rear portion a radially-inward extending flange 21 engaged by a threaded nut 22 which is screwed onto a threaded lip portion 23 of the nozzle 15. The nut 22 thus retains the cover member 20 and speed-setting ring 17 in the operating positions shown.

As is usual, the cover member 20 has appreciable thickness with tapered outside walls 24, a front wall or face 25 and a rear wall 26. The tapered outside walls 24 extend between the front face 25 and the rear wall 26 of the member as shown, and may carry indicia for reference purposes, in connection with the various settings of the speed-setting ring 17, etc.

Shown in broken outline is an exposure lens structure 28, which is adapted to fit within the opening of the cover member 20 and the nozzle 15; details of such exposure lens structure are not given herein since they are unessential to the present invention.

At the rear of the housing 10 are also provided the usual bearing shoulders 30 and 31, as is well understood in the art.

As shown in Fig. 2 the cover member 20 may be provided with the conventional lock screw 32 which is cooperable with notches 33 in the nut or threaded ring 22, in order to lock the latter in the desired position, with a predetermined amount of looseness for the ring 17.

In accordance with the present invention I form the cover member 20 so that it may receive and accommodate the casing 35 of an electrical measuring device, with the height of the device extending fore and aft or in an axial direction. As shown in Fig. 1, I provide a relatively deep cavity or recess 36 opening at the rear of the cover member 20, said recess extending closely adjacent the front face 25 of the member. The recess 36 also extends a certain distance circumferentially of the shutter housing 10, thereby to accommodate the greater transverse dimension of the casing 35 of the measuring device, as clearly shown in Fig. 2. Thus, I am enabled to locate the electrical measuring device wholly within the casing 10, to be protected thereby, all without requiring protuberant parts. I have found, moreover, that with shutter structures of the type illustrated herein, it is advantageous to provide a through opening 37 in the base plate 14, said opening being located in registration with the recess 36. The casing 35 may then be extended through the opening 37, thus providing a still greater amount of space. Also, in accordance with the present invention I may provide for fixedly attaching the casing 35, notably the base 38 thereof, to the rear transverse wall 12 of the shutter housing 10.

It will be noted that the casing 35 of the measuring device may extend not only through the aperture 37 of the base plate 14, the space **14*a* within the housing 10 and the recess 36 of the annulus 20, but also through a space 40** which is the motion space of the shutter blades not shown.

By virtue of the above construction I have effected a novel and advantageous incorporation of the electrical measuring device of the exposure regulator in the shutter housing structure, and obtain thereby a three-fold advantage. First, it is not necessary to alter any of the basic fundamental dimensions or proportions of the shutter housing and accompanying structures, and thus standard shutter constructions of various types of cameras may be made to accommodate the measuring device without considerable change. Second, the measuring device is incorporated without the necessity for providing special or protuberant housings or housing sections, which would jut out and present an unsightly appearance. Third, the measuring device is at all times fully enclosed and securely protected, and thus there is no likelihood of damage or malfunctioning due to accidental blows or the like. Furthermore, the improved shutter housing construction of this invention is seen to be extremely simple and economical to fabricate.

While I have illustrated the casing 35 of the measuring device in conjunction with a shutter construction wherein the casing extends from the rear wall of the shutter housing to a point closely adjacent the front wall of the cover member 20, it will be readily understood that certain different shutter constructions may have deeper housings, wherein sufficient space will be available for the electric measuring device by providing only the recess in the cover member 20, and accordingly the invention is not to be limited to the perforating of the base plate 14 and the mounting of the casing 35 on the bottom wall 12 of the housing 10. The scope of the invention is defined in the appended claim, and variations and modifications may be made within the scope of the claim and portions of the improvements may be used without others.

I claim:

In a photographic intra-lens shutter housing construction, in combination, an intra-lens shutter housing, said housing having a bottom wall and outer peripheral side wall, a shutter base plate mounted against said bottom wall, said housing being adaptable for an incorporated electric exposure regulator, an adjustable speed setting ring resting on said peripheral wall, a front cover member for said housing comprising a thick annulus located at the front of said housing and bearing against said ring, said annulus having a tapered outside wall of appreciable height and an inside wall disposed an appreciable distance inwardly of said outside wall, and also having front and back walls between which said outside and inside walls extend, and further having a rearwardly opening recess in said back wall, said recess at its bottom extending close to said front wall, said recess extending from said back wall through said ring through an unoccupied portion of the shutter housing and through said base plate, and an electric measuring device disposed in the shutter housing and extending from the front to the rear thereof, and through said ring and said base plate, said device at its front portion projecting into said recess of the cover annulus, and means fixedly securing said measuring device to said bottom wall of the shutter housing.

References Cited in the file of this patent

UNITED STATES PATENTS

| | | |
|---|---|---|
| 2,297,262 | Tonnies | Sept. 29, 1942 |

FOREIGN PATENTS

| | | |
|---|---|---|
| 826,411 | France | Jan. 4, 1938 |
| 502,908 | Great Britain | Mar. 28, 1939 |
| 905,449 | France | Apr. 16, 1945 |
| 756,282 | Germany | Feb. 23, 1953 |
| 906,657 | Germany | Mar. 15, 1954 |
| 916,929 | Germany | Aug. 19, 1954 |